United States Patent [19]

Belart

[11] Patent Number: 4,611,858

[45] Date of Patent: Sep. 16, 1986

[54] HYDRAULIC BRAKE SYSTEM

[75] Inventor: Juan Belart, Walldorf, Fed. Rep. of Germany

[73] Assignee: Alfred Teves GmbH, Frankfurt am Main, Fed. Rep. of Germany

[21] Appl. No.: 744,738

[22] Filed: Jun. 14, 1985

[30] Foreign Application Priority Data

Jun. 19, 1984 [DE] Fed. Rep. of Germany ....... 3422620

[51] Int. Cl.[4] .......................... B60T 8/02; B60T 13/12
[52] U.S. Cl. ..................... 303/6 R; 188/345; 303/111; 303/114; 303/119; 303/84 R
[58] Field of Search .................. 303/111, 113–119, 303/61–63, 68–69, 6 R, 6 A, 100, 13–14, 84, 92, 6 C; 188/345, 349, 181; 60/545, 547.1, 581, 582

[56] References Cited

U.S. PATENT DOCUMENTS

| 4,404,803 | 9/1983 | Steffes ............................... 303/13 X |
| 4,418,966 | 12/1983 | Hattwig .......................... 303/6 R X |
| 4,480,876 | 11/1984 | Sato et al. ...................... 303/111 X |
| 4,515,412 | 5/1985 | Sato ................................ 303/111 X |
| 4,547,022 | 10/1985 | Brearley et al. ................ 303/111 X |

Primary Examiner—Douglas C. Butler
Attorney, Agent, or Firm—James B. Raden; William J. Michals

[57] ABSTRACT

A vehicular hydraulic brake system wherein valve means are provided which in the release position of the brake and during normal braking actions establish communication between diagonally opposite wheel brakes and which preferably hydraulically connect the wheel brakes of the rear axle of the automotive vehicle with each other. In order to achieve a higher degree of operational safety a change-over valve which is controllable by the pressure prevailing in the pressure chamber of the hydraulic power booster is connected at each wheel brake of the rear axle. Each change-over valve connects diagonally opposite wheel brakes with each other in a first position and, upon pressurization, interrupts this communication and establishes a communication between two wheel brakes of one vehicle axle.

16 Claims, 3 Drawing Figures

HYDRAULIC BRAKE SYSTEM

BACKGROUND OF THE INVENTION

This invention relates to a hydraulic brake system for automotive vehicles which is provided with a master cylinder and a hydraulic power booster connected upstream of the master cylinder and having a pressure chamber wherein an auxiliary pressure depending on the actuating force is established by means of a pedal-operable brake valve. Two brake circuits of the automotive vehicle are pressurizable by the braking pressure generator which consists of the master cylinder and of the power booster. In the brake system, first valve means are provided by means of which, in dependence on the operating signals of slip control electronics, the pressure supply to the brake circuits is interrupted and pressure medium is tapped from the brake circuits. Second valve means are provided which in case of control can be switched over and establish a hydraulic communication between two wheel brakes of one vehicle axle. The wheel brakes of one brake circuit are arranged diagonally opposite at the vehicle and the wheel brakes are connectible with the pressure chamber of the hydraulic power booster.

A hydraulic brake system featuring the above characteristics is described in the German patent application No. P 33 20 822.0. The brake system described in the application has a hydraulic power booster with a pressure chamber wherein an auxiliary hydraulic pressure may be established in dependence on an actuating force exerted on a brake pedal. To this end, a lever mechanism is fixed to a push rod connected with the brake pedal by means of which a brake valve can be operated. The brake valve is designed so as to ensure that in the release position of the brake a hydraulic communication exits between the pressure chamber of the hydraulic power booster and an unpressurized supply reservoir. When a force is applied to the brake pedal or when there is a displacement of the push rod connected with the brake pedal, a piston of the brake valve moves into an operating position so that the pressure of a pressure accumulator may enter the pressure chamber of the hydraulic power booster. This ensures that a booster piston is displaced in the direction of actuation. The result of a displacement of the booster piston of the hydraulic power booster is that the pistons of a master cylinder connected downstream of the hydraulic power booster are displaced, and the working chambers of the master cylinder are pressurized.

In the brake system described in the noted German patent application, the master cylinder has a piston and thus limits a working chamber where a first brake circuit is connected. The first brake circuit has two wheel brakes of an automotive vehicle, with the wheel brakes being arranged diagonally opposite at an automotive vehicle. A second brake diagonal or a second brake circuit hydraulically communicated with the pressure chamber of the hydraulic power booster. In the known brake system, upstream of each wheel brake of the front axle of the automotive vehicles, a 2/2-way valve is connected which may be electrically switched over, which normally adopts an open position, and which may be switched into a locking position by slip control electronics. Further, a 2/2-way valve is connected to each wheel brake of the front axle of the automotive vehicles, which likewise is operable by slip control electronics and which upon actuation by the slip control electronics establishes a hydraulic communication between the respective wheel brake and an unpressurized supply reservoir. In the brake diagonal connected to the pressure chamber of the hydraulic power booster, a normally open solenoid valve is arranged at the respective wheel brake of the rear axle of the automotive vehicle. The valve is likewise controllable by the slip control electronics. Moreover, a normally closed solenoid valve is connected at this wheel brake by means of which the braking pressure of the respective rear axle of the automotive vehicles can be reduced.

A further component of the known brake system is a change-over valve which at the beginning of the brake slip control may be switched into an open position and which thus establishes a hydraulic communication between the pressure chamber of the hydraulic power booster and the working chamber of the master cylinder. As soon as such a communication is established, a hydraulically operable valve arrangement is switched over, and the wheel brakes arranged at the rear axle of the automotive vehicle hydraulically are connected with each other.

In case of control the pressure may be adjusted individually in the wheel brakes of the front axle whereas the braking pressure in the wheel brakes of the rear axle of the automotive vehicle may only be controlled together. The advantage of this arrangement is that two electromagnetically operable hydraulic valves can be eliminated at the rear axle of the automotive vehicle.

A disadvantage of the brake system described above is that in case of a circuit failure at the rear axle of the automotive vehicle, no braking effect will result at either wheel brake of the real axle. It is thus an object of this invention to further develop the described brake system so as to ensure that in case of a circuit failure the disturbed part of the brake system is switched off in a predetermined manner.

SUMMARY OF THE INVENTION

According to this invention this object is achieved in that a change-over valve controllable by the pressure prevailing in the pressure chamber of the hydraulic power booster is connected at each wheel brake of the rear axle, each change-over valve connecting diagonally opposite wheel brakes with each other in a first position and, upon pressurization, interrupting this communication and establishing a communication between two wheel brakes of one vehicle axle. In an advantageous and expedient further embodiment the change-over valves are designed as double-seat valves, each of the double seat valves having an annular piston slidably guided in a cylinder bore and normally, by way of the axial channels of the annular pistons, a hydraulic communication being established between diagonally opposite wheel brakes.

In each of the double-seat valves one front face of the annular piston is designed as a first closure member normally caused by spring forces to abut on a first valve seat. Hydraulic communication between the pressure chambers of the braking pressure generator is controllable by the first valve seats and the first closure members. Further, it is an advantage if each double-seat valve has a piston displaceable by the pressure of the pressure chamber of the hydraulic power booster and having a second closure member formed fast therewith, by means of which the axial channel of the annular piston may be locked and the annular piston may be lifted off from the first valve seat. In this connection hydraulic communication is provided between the wheel brakes of one vehicle axle controllable by the second valve seats and the second closure members of the double-seat valves.

An advantageous further embodiment provides that housing chambers of the double-seat valves, which are communicating with each other, may be locked by the first valve seats and the first closure members. In case of control the housing chambers may be pressurized by the pressure prevailing in the pressure chamber of the hydraulic power booster. Third valve means are provided by means of which the pressure supply to the housing chambers may be shut off and pressure medium may be tapped from the housing chambers. In case of control (when the double-seat valves are switched over) the pressure in the wheel brakes of the rear axle of the automotive vehicle may be adjusted by two 2/2-way valves controllable by slip control electronics, thus a saving of valve means resulting as compared with individual control.

Further, it is an advantage if a valve is connected upstream of the control ports of the double-seat valves which in the non-braking operation as well as during normal braking actions connects the control ports with an unpressurized supply reservoir. In case of control the valve interrupts this communication and connecting the control ports with the pressure chamber of the hydraulic power booster. The valve connected upstream of the double-seat valves is likewise designed as a double-seat valve and is preferably hydraulically controllable. The pressure supply to the valve connected upstream of the double-seat valves advantageously is effected in that a normally closed 2/2-way valve, which may be switched into an open position, is connected to the pressure chamber of the hydraulic power booster, said 2/2-way valve being controllable by slip control electronics and thus controlling the pressure supply to the control ports of the double-seat valves.

In the brake system in accordance with the present invention a tandem master cylinder with two working chambers is preferably used as master cylinder, each of the working chambers of the tandem master cylinder communicating with the pressure chamber of the hydraulic power booster by way of a connecting valve connected to the 2/2-way valve. Such a design also increases the operational safety of the brake system. Expediently, the connecting valve comprises two valve units associated with one working chamber, each valve unit having a normally open first valve passage by means of which a communication may be established between a working chamber and an unpressurized supply reservoir. A normally closed second valve passage may be switched into an open position when the 2/2-way valve connected to the pressure chamber of the hydraulic power booster is actuated. Thus, with the first valve passage closed, a communication is established between the pressure chamber of the hydraulic power booster and the working chambers of the master cylinder. Each valve unit is advantageously provided as a hydraulically controllable double-seat valve. In each valve unit a control piston having valve closure members is provided and the effective surfaces of the control piston which bear against each other, are exposed to a control chamber which, by way of the 2/2-way valve, may be pressurized by the pressure of the pressure chamber of the hydraulic power booster. Alternatively, a control chamber may be provided which is associated with each control piston wherein each control chamber is pressurizable by the pressure of the pressure chamber of the hydraulic power booster by way of a respective 2/2-way valve and wherein each control chamber is confined by a supporting surface for the control piston. In this arrangement it is advantageous for the control chamber of the connecting valve to normally communicate with the unpressurized supply reservoir by way of a 3/2-way valve controllable by slip control electronics. In the operating position of the 3/2-way valve the control chamber directly communicates with the pressure chamber of the hydraulic power booster.

BRIEF DESCRIPTION OF THE DRAWING

This invention is explained in more detail below reference being made to the drawing wherein.

DETAILED DESCRIPTION

Figure 1:
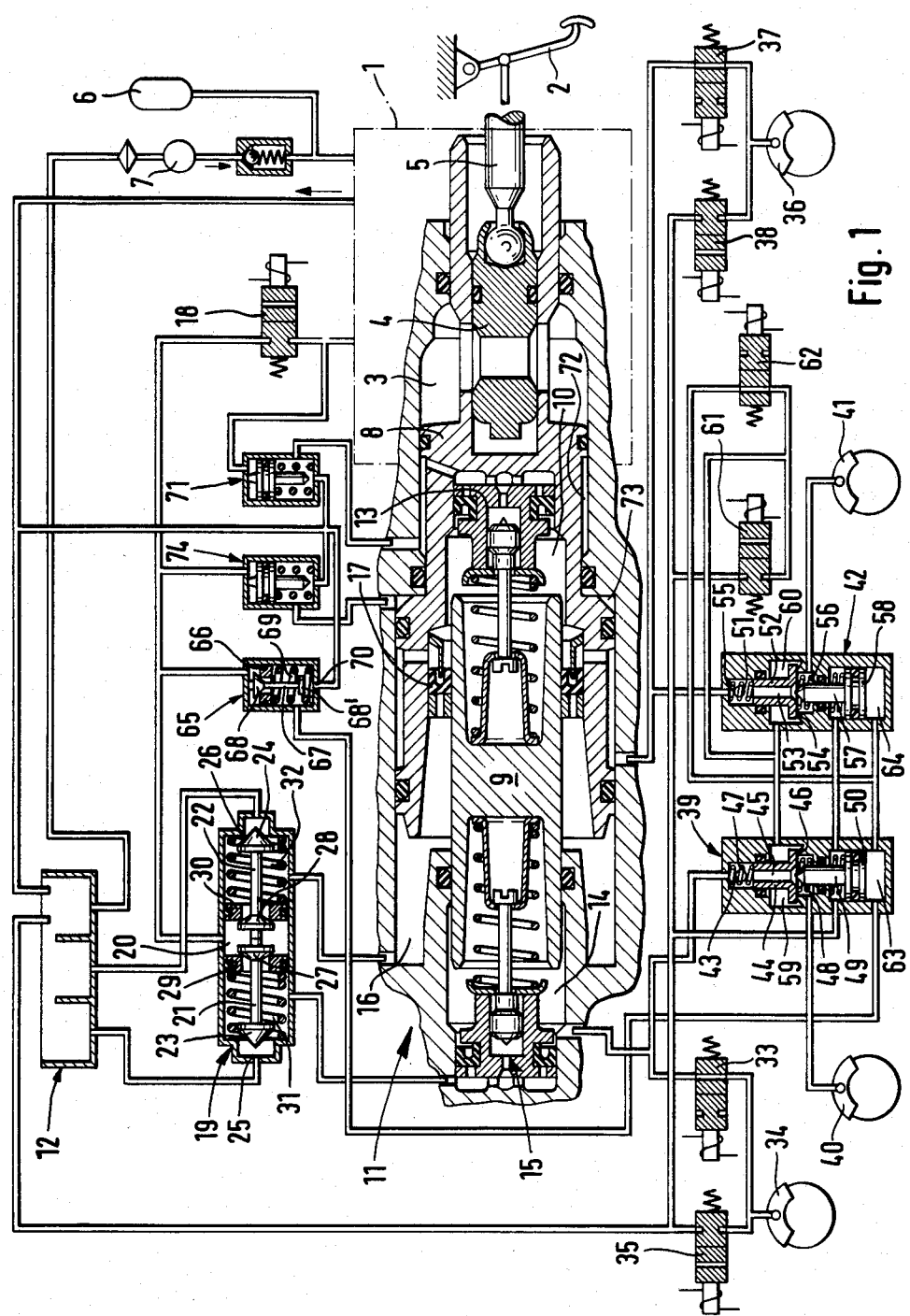
FIG. 1 is the section of a hydraulic brake system.

In the drawing figures like elements have been assigned like reference numerals. In FIG. 1, reference numeral 1 designates a schematically represented hydraulic power booster which is operable by a brake pedal 2. The hydraulic power booster 1 has a pressure chamber 3 wherein upon force application to the brake pedal 2 a hydraulic pressure may be established by way of a brake valve not shown in the drawing, said pressure being proportional to the respective actuating force exerted on the brake pedal 2. When a force is applied to the brake pedal 2 a core piston 4 is displaced in the direction of actuation by means of a push rod 5, thus an actuation of the brake valve resulting and pressure medium flowing from a pressure accumulator 6 into the pressure chamber 3 of the hydraulic power booster 1. The pressure accumulator 6 is a part of an auxiliary energy supply system where by means of suitable contacts a pressure medium pump 7 is controlled such as to ensure that the pressure accumulator 6 is always charged up to a certain level and contains a corresponding volume of fluid.

A booster piston 8 confines the pressure chamber 3 of the hydraulic power booster 1. At its pedal-remote front face, the booster piston 8 has an essentially pocket-like bore wherein a master cylinder piston 9 is slidably guided in a sealed manner. Together with the booster piston 8, the master cylinder piston 9 confines a first working chamber 10 of a tandem master cylinder 11. The first working chamber 10 normally hydraulically communicates with an unpressurized supply reservoir 12. After a relatively small displacement of the booster piston 8, said working chamber 10 may be shut off from the unpressurized supply reservoir 12 by means of a central valve 13. The master cylinder piston 9 has a rotationally symmetrical design. By means of its pedal-remote front face it confines a second working chamber 14 which, by way of a further central valve 15, normally communicates with the unpressurized supply reservoir 12 and which may be separated from the unpressurized reservoir upon a suitable displacement. The pedal-remote front face of the booster piston 8 confines an annular housing chamber 16 pressurized upon a displacement of the booster piston 8, thus additional pressure fluid volume flowing into the first working chamber 10 by way of a gasket 17. Thereby, upon an actuation of the tandem master cylinder 11, a relative displacement results between the booster piston 8 and the master cylinder piston 9.

A 2/2-way valve 18 controllable by slip control electronics not shown in the drawing is connected to the pressure chamber 3 of the hydraulic power booster 1. When de-energized, said 2/2-way valve 18 adopts a locking position. By means of corresponding control signals it may be switched into an open position. Connected to the 2/2-way valve 18 is an inlet valve 19 designed in detail as follows:

The inlet valve 19 has a control chamber 20. Effective surfaces of two valve pistons 21, 22 are exposed to said control chamber 20. Each of the valve pistons 21, 22 has a valve closure member 23, 24 at its end averted from the control chamber 20. Cooperating with valve seats 25, 26, said valve closure members 23, 24 form valve passages. When the control chamber 20 is not pressurized, said valve passages 23, 25; 24, 26 are open. Thus, on the one hand, there exists a hydraulic communication between the unpressurized supply reservoir 12 and the second working chamber 14 of the tandem master cylinder 11. On the other hand, a hydraulic communication is established between the unpressurized supply reservoir 12 and respectively the annular housing chamber 16 and the first working chamber 10 of the tandem master cylinder 11. With regard to the control chamber 20, the inlet valve 19 has a rotationally symmetrical design, the two valve pistons 21, 22 bearing against each other in the rest position (when the control chamber 20 is unpressurized) as seen in the drawing. The end zones of the valve pistons 21, 22 facing the control chamber 20 are also designed as valve closure members 27, 28 and support themselves on the annular pistons 29, 30, with the annular pistons 29, 30 being biased by the compression springs 31, 32 in the direction of the control chamber 20. Axial openings of the annular pistons 29, 30 may be locked by the valve closure members 27, 28, thus further valve passages resulting by means of which a communication may be established between the control chamber 20 and the working chambers 14, 10 of the tandem master cylinder 11.

By way of a 2/2-solenoid valve 33 electromagnetically controllable by the non-illustrated slip control electronics, a wheel brake 34 of an automotive vehicle is connected with the working chamber 14. The wheel brake 34 is preferably arranged on the front axle of the automotive vehicle. The electromagnetically operable 2/2-way valve 33 normally adopts an open position and may be switched into a locking position. At the wheel brake 34 a further 2/2-way valve 35 is connected which normally is closed and which during control, if the need arises, is switched over by the slip control electronics. Thus a hydraulic communication is established between the wheel brake 34 and the unpressurized supply reservoir 12, with the 2/2-way valve 33 being closed. Likewise, a wheel brake 36 of the automotive vehicle is connected with the working chamber 10 of the tandem master cylinder 11. The wheel brake 36 likewise is arranged at the front axle of the automotive vehicle. Between the working chamber 10 and the wheel brake 36 there is likewise a 2/2-way valve 37 which in terms of function and design corresponds to the valve 33. Connected to the wheel brake 36 is a further 2/2-way valve which corresponds to the valve 35 connected to the wheel brake 34.

Further a wheel brake 40 of the rear axle of the automotive vehicle is connected by way of a double-seat valve 39 to the working chamber 14 of the tandem master cylinder 11. The wheel brake 40 lies diagonally opposite the wheel brake 34. Between the working chamber 10 of the tandem master cylinder 11 and a wheel brake 41 of the automotive vehicle, which lies diagonally opposite the wheel brake 36, a further double-seat valve 42 is connected. In terms of function and design, said double-seat valve 42 corresponds to the double-seat valve 39. In the double-seat valve 39 an inlet chamber 43 is provided. Amongst other elements, an annular piston 44 confines the inlet chamber 43. The annular piston 44, on its part, has an axial channel 45 by means of which a hydraulic communication is established between the working chamber 14 of the tandem master cylinder 11 and the wheel brake 40 in the operating position shown in the drawing. In the position referred to, the front face of the annular piston 44 which is averted from the inlet chamber 43 is abutted on a valve seat 46. The rest position of the annular piston 44 is established by compression springs 47, 48.

The end of the axial channel 45, which is averted from the inlet chamber 43, is designed as a valve seat and may be closed by a valve closure member 49. The valve closure member 49 is connected with a piston 50 whose lower front face, as shown in the drawing, is pressurizable by a hydraulic pressure. Upon a suitable pressurization, the piston 50 moves upwards in the drawing. Thereby it closes the valve closure member 49 of the axial channel 45 of the annular piston 44 of the double-seat valve 39. After a further displacement it lifts off the annular piston 44 from the valve seat 46. As already explained the double-seat valve 42 has the same design as the double-seat valve 39 and has an inlet chamber 51, an annular piston 52, an axial channel 53, a valve seat 54, compression springs 55, 56, a valve closure member 57, and a piston 58. Each of the double-seat valves 39, 42 has a housing chamber 59, 60. The housing chambers 59, 60 are permanently communicating with each other. Connected to a connection line between the housing chambers 59, 50 is a 2/2-way valve 61 which is controllable by the slip control electronics and normally adopts a locking position. When it is switched over it establishes a communication between the housing chambers 59, 60 and the unpressurized supply reservoir 12. Further, a 2/2-way valve 62 likewise controllable by the slip control electronics is connected to the housing chambers 59, 60 of the double-seat valves 39, 42. Said valve 62 normally is open and may be switched by the slip control electronics into a locking position. In the position shown in the drawing, the 2/2-way valve 62 is open. In this open position the pressure which acts on the pistons 50, 58 of the double-seat valves 39, 42 is supplied to the housing chambers 59, 60. Referring to the drawing, the lower front surfaces of the pistons 50, 58 confine control chambers 63, 64 which by means of a change-over valve 65 alternatively are communicating with the unpressurized supply reservoir 12 or are pressurized by the respective pressure prevailing in the pressure chamber 3 of the hydraulic power booster 1. The change-over valve 65 is connected to the 2/2-way valve 18 and is likewise designed as a double-seat valve.

The change-over valve has an annular piston 66 wherein a valve piston 67 is guided. Referring to the drawing, the upper end of the valve piston 67 is designed as a valve closure member 68. The end forms a valve passage cooperating with the annular piston 66. The valve piston 67 is kept in an upper end position (as viewed in the drawing) by means of the force of a compression spring 69. The end of the valve piston 67, which is averted from the valve closure member 68 of the valve piston 67, is likewise designed as a valve closure member 68' which may be caused to abut on a valve seat 70, thus a hydraulic communication between the unpressurized supply reservoir 12 and the control chambers 63, 64 of the double-seat valves 39, 42 being interruptible. When the 2/2-way valve 18 is switched over the valve piston 67 is caused by the pressurization of the annular piston 66 and of the valve closure member 68 to move downwards in the drawing until the valve closure member 68' comes to abut on the valve seat 70, thus separating the unpressurized supply reservoir 12 from the control chambers 63, 64 of the double-seat valves 39, 42. The pressure increasing, the annular piston 66 of the change-over valve 65 moves downwards in the drawing. Thereby a valve passage is opened between the valve closure member 68 and the annular piston 66. Thus the respective pressure prevailing in the pressure chamber 3 of the hydraulic power booster 1 reaches the control chambers 63, 64 of the double-seat valves and effects a displacement of the pistons 50, 58.

A check valve 71 is connected to the pressure chamber 3 of the hydraulic power booster 1 which in the non-braking operation of the automotive vehicle establishes a hydraulic communication between an annular housing chamber 72 of the hydraulic power booster and the unpressurized supply reservoir 12. As soon as a pressure is built up in the pressure chamber 3 of the hydraulic power booster 1, when a force is applied to the brake pedal 2, the check valve 71 comes into a position in which the annular housing chamber 72 which normally communicates with the unpressurized supply reservoir 12 is locked. As previously described, the booster piston 8 is designed as a stepped piston, at the shoulder of the booster piston 8 a housing chamber being formed, together with the housing. The housing chamber normally communicates with the unpressurized supply reservoir 12 by way of a check valve 74 corresponding to the check valve 71. When the 2/2-way valve is switched over, it adopts an operating position in which the housing chamber 73 is locked.

In the following, the mode of operation of the described brake system will be explained in more detail, proceeding on the assumption that the brake is in its release position. Further it is assumed that the pressure medium pump 7 has charged the pressure accumulator 6 up to a sufficient pressure level. In the non-braking situation all the moving parts of the brake system illustrated in FIG. 1 adopt the positions shown in the drawing.

When a force is applied to the brake pedal 2 there results a displacement of the push rod 5 to the left in the drawing. Thus a hydraulic pressure is established in the pressure chamber 3 by way of the power booster 1 by way of the brake valve hinged to the push rod 5. The pressure prevailing in the pressure chamber 3 of the hydraulic power booster, when a certain actuating force is exerted on the brake pedal 2, will cause the booster piston 8 to be diplaced in the actuating direction. Thus, at first, the central valve 13 is closed and a communication between the working chamber 10 of the tandem master cylinder 11 and the unpressurized supply reservoir 12 is interrupted. As the displacement of the booster piston 8 continues due to an increase in the force exerted on the brake pedal 2 the booster piston 8 moves further into the annular housing chamber 16 and, by way of the gasket 17 displaces a volume towards the working chamber 10 of the tandem master cylinder 11, the central valve 13 being closed. Due to the pressure now prevailing in the working chamber 10 the master cylinder piston 9 is displaced in the actuating direction. Thus also the central valve 15 is closed and there may be a pressure build-up in the working chamber 14 of the tandem master cylinder. The pressure thus established in the working chamber 14 of the tandem master cylinder proceeds by way of the open 2/2-way valve 33 to the wheel brake 34 and, by way of the double-seat valve 39, to the wheel brake 40 lying diagonally opposite the wheel brake 34. Likewise, the pressure established in the working chamber 10 of the tandem master cylinder 11 proceeds to the wheel brake 36 by way of the open 2/2-way valve 37, and, simultaneously, by way of an open double-seat valve 42, to the wheel brake 41 lying diagonally opposite the wheel brake 36. In such an operating condition the piston arranged in the check valve 71 is moved downwards in the drawing against a compression spring. Thus the annular housing chamber 72 is separated from the unpressurized supply reservoir 12.

When the associated slip control electronics register the existence of a critical slip value at any one or at several of the vehicle's wheels associated with the wheel brakes 34, 40, 41, 36, the slip control electronics switch the 2/2-way valve 18 over so that the pressure prevailing in the booster chamber 3 reaches the change-over valve 65 by way of the 2/2-way valve 18 and displaces the valve piston 67 downwards in the drawing until, finally, the valve closure member 68 has been caused to abut on the valve seat 70. Consequently, the control chambers 63, 64 of the double-seat valves 39, 42 are separated from the unpressurized supply reservoir 12.

Likewise, the pressure established in the pressure chamber 3 of the hydraulic power booster now reaches the control chamber 20 of the inlet valve 19 by way of the electromagnetically switched-over 2/2-way valve 18. Further, the housing chamber 73 is separated from the unpressurized supply reservoir 12 because of the pressurization of the piston arranged in the check valve 74.

The result of the pressurization of the control chamber 20 of the inlet valve 19 is that, when a certain pressure is attained, the valve pistons 21, 22 with the annular pistons 29, 30 are moved against the forces of the compression springs 31, 32 in the direction of the valve seats 25, 26. Thus, hydraulic communications between the unpressurized supply reservoir 12 and the tandem master cylinder 11 are interrupted. Upon a pressure increase in the control chamber 20 of the inlet valve 19, finally the pressure prevailing in the control chamber 20 moves the annular pistons 29, 30 against the forces of the compression springs 31, 32. Thus, valve passages become open between the valve closure members 27, 28 and the annular pistons 19, 30 (translator's note: the reference numerals should be '29, 30'). The valve passages are opening a hydraulic communication between the pressure chamber 3 of the hydraulic power booster 1 and the working chambers 10, 14 of the tandem master cylinder. By way of the 2/2-way valve 18 and the change-over valve 65, a pressurization of the control chambers 63, 64 of the double-seat valves 39, 42 is effected. Thus the pistons 58, 50 of the double-seat valves 39, 42 are moved upwards in the drawing. Thus, at first a hydraulic communication is interrupted between the wheel brakes 34, 40, and 36, 41, respectively. The movement of the pistons 50, 58 continuing, the annular pistons 44, 42 finally are lifted off from the valve seats 46, 54. Thus the housing chambers 59, 60 of the double-seat valves 39, 42 are hydraulically communicating with each other. In such an operating condition, however, also the wheel brakes 40, 41 are communicating with each other.

From the above explanations it should not be apparent that the brake system in accordance with the present invention which normally has a diagonal brake circuit allotment is switched over to a so-called Y-brake circuit allotment in case of control. With regard to the braking pressure, the wheel brakes 34, 36 arranged at the front axle of the automotive vehicle are individually controlled by the electromagnetically operable 2/2-way valves 33, 35, 37, 38 whereas, with regard to the braking pressure, the wheel brakes 40, 41 which, as described above, were hydraulically connected with each other are jointly controllable by means of the electromagnetically operable 2/2-way valves 61 62. Thereby a saving of valve means results as compared with individual control.

Figure 2:
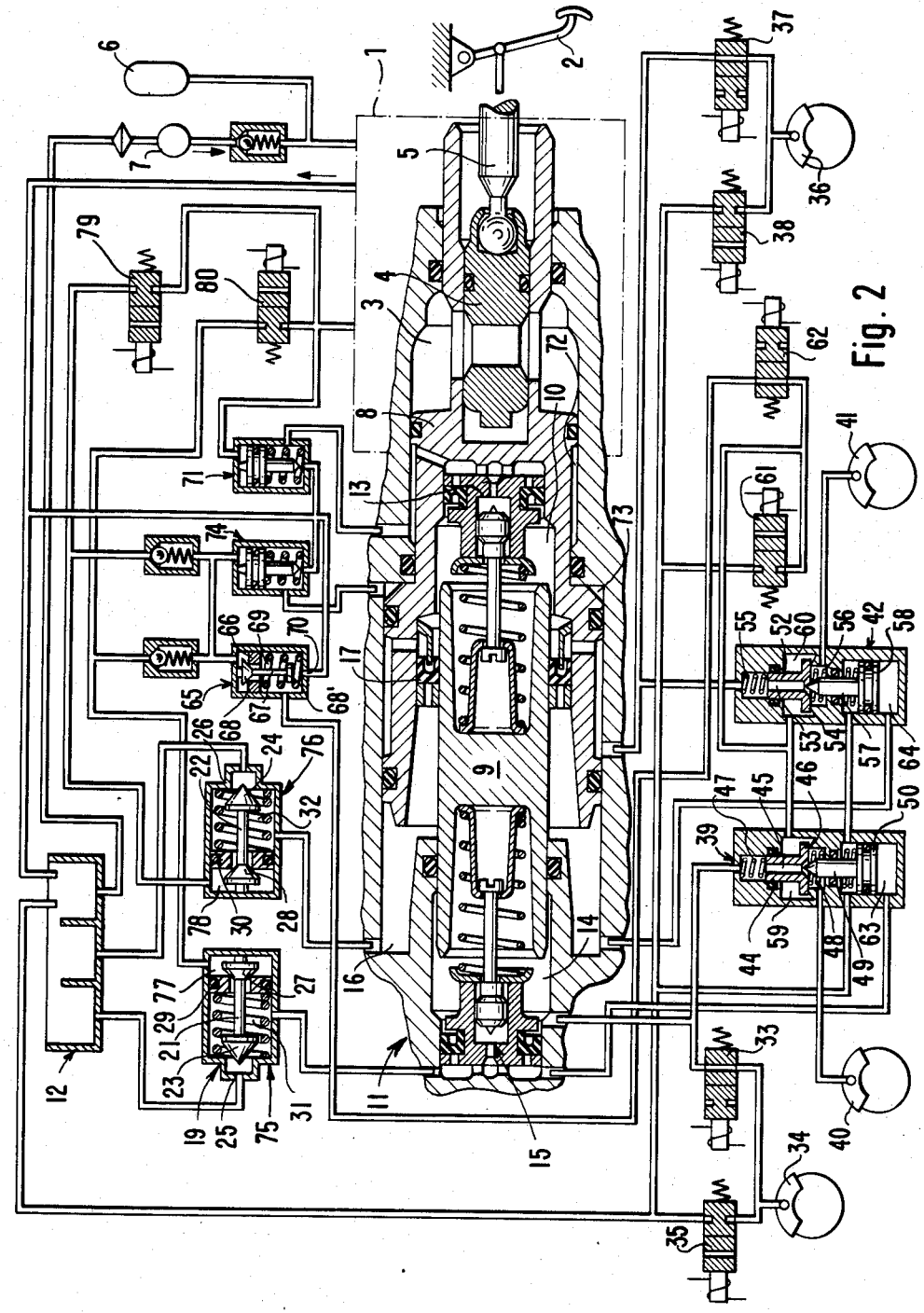
FIGS. 2 and 3 show brake systems with modified valve designs as compared with FIG. 1.

At the end of a control operation the slip control electronics not shown in the drawing switch the 2/2-way valve 18 back into its rest position, thereby also the valves 74, 65, 19 returning into their rest position. When releasing the brake, the kinetic operations described above are reversed until the positions of all moving parts shown in the drawing are restored. In FIG. 2 a hydraulic brake system of the type referred to at the beginning is illustrated where the inlet valve 19 is bipartite and has two double-seat valves 75, 76 working independently of each other. To this end, the double-seat valves 75, 76 have two control chambers 77, 78 which hydraulically are separated from each other and which, by way of two 2/2-way valves 79, 80 operable independently of each other, are pressurizable by the pressure of the pressure chamber 3 of the hydraulic power booster 1. As for the rest, the brake system illustrated in FIG. 2 corresponds to the brake system according to FIG. 1.

Figure 3:
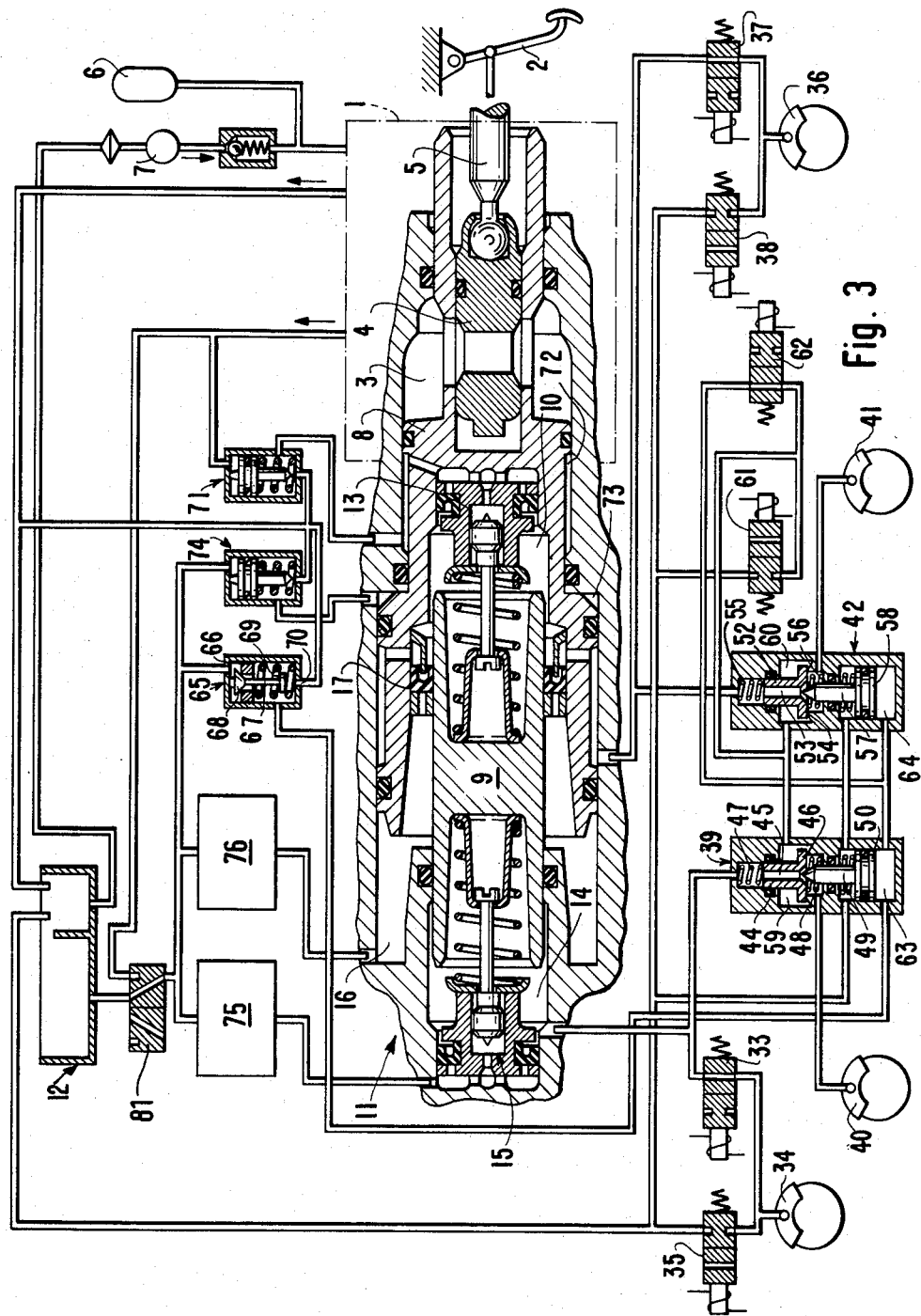

In the embodiment represented in FIG. 3 2/2-way valves 79, 80 are replaced by a jointly controllable 3/2-way valve 81. As for the rest, the design and mode of operation of the brake system illustrated in FIG. 3 correspond to the brake systems according to FIGS. 1 and 2.

What is claimed is:

1. A hydraulic brake system for automotive vehicles, which is provided with a master cylinder and a hydraulic power booster connected upstream of the master cylinder and having a pressure chamber wherein an auxiliary pressure depending on the actuating force is established by means of a pedal-operable brake valve wherein two brake circuits of the automotive vehicle are pressurizable by the braking pressure generator which consists of the master cylinder and of the power booster wherein first valve means are provided by means of which, in dependence on the operating signals of slip control electronics, the pressure supply to the brake circuits is interrupted and pressure medium is tapped from the brake circuits, and wherein second valve means are provided which in case of control can be switched over and establish a hydraulic communication between two wheel brakes of one vehicle axle, with the wheel brakes of one brake circuit at a time being arranged diagonally opposite at the vehicle and with the wheel brakes being connectible with the pressure chamber of the hydraulic power booster, wherein a change-over valve (39, 42) controllable by the pressure prevailing in the pressure chamber (3) of the hydraulic power booster (1) is connected at each wheel brake (40, 41) of the rear axle, with each change-over valve (39, 42) connecting diagonally opposite wheel brakes (34, 40; 36, 41) with each other in a first position and, upon pressurization, interrupting this communication and establishing a communication between two wheel brakes (40,41) of one vehicle axle.

2. A hydraulic brake system as claimed in claim 1, wherein the change-over valves (39, 42) are provided as double-seat valves.

3. A hydraulic brake system as claimed in claim 2, wherein each double-seat valve (39, 42) has an annular piston (44, 52) slidably guided in a cylinder bore and wherein a hydraulic communication is established between diagonally opposite wheel brakes (34, 40; 36, 41) by way of the axial channels (45, 53) of the annular pistons (44, 52).

4. A hydraulic brake system as claimed in claim 3, wherein one front face of the annular piston (44, 52) is provided as a first closure member normally caused by spring forces to abut on a first valve seat (46, 54).

5. A hydraulic brake system as claimed in claim 1 wherein hydraulic communications between the pressure chambers (10, 14) of the braking pressure generator (1, 11) are controllable by the first valve seats (46, 54) and the first closure members (44, 52).

6. A hydraulic brake system as claimed in claim 5, wherein each double-seat valve (39, 42) has a piston (50, 58) displaceable by the pressure of the pressure chamber (3) of the hydraulic power booster (1) had having a second closure member (49, 57) formed therewith by means of which the axial channel (45, 53) of the annular piston (44, 52) can be locked and the annular piston (44, 52) can be lifted from the first valve seat (46, 54).

7. A hydraulic brake system as claimed in claim 6, wherein hydraulic communications between the wheel brakes (40, 41) of one vehicle axle are controllable by the second valve seats and the second closure members (49, 57).

8. A hydraulic brake system as claimed in claim 7 wherein housing chambers (59, 60) of the double-seat valves (39, 42), which are communicating with each other, can be locked by the first valve seats (46, 54) and by the first closure members (44, 52); wherein in case of control the housing chambers (59, 60) can be pressurized by the pressure prevailing in the pressure chamber (3) of the hydraulic power booster (1); and wherein third valve means (61, 62) are provided by means of which the pressure supply to the housing chambers (59, 60) can be shut off and pressure medium may be tapped from the housing chambers (59, 50).

9. A hydraulic brake system as claimed in claim 8 wherein a valve (65) is connected upstream of the control ports of the double-seat valves (39, 42) which in the non-braking operation and during normal braking actions connects the control ports with an unpressurized supply reservoir (12), in case of control said valve (65) interrupting this communication and connecting the control ports with the pressure chamber (3) of the hydraulic power booster (1).

10. A hydraulic brake system as claimed in claim 9, wherein the valve (65) is designed as double-seat valve and in that it is hydraulically controllable.

11. A hydraulic brake system as claimed in claim 10, wherein a normally closed 2/2-way valve (18) which may be switched into an open position is connected to the pressure chamber (3) of the hydraulic power booster (1), said 2/2-way valve (18) being controllable by slip control electronics and controlling the pressure supply to the control ports of the double-seat valves (39, 42).

12. A hydraulic brake system as claimed in claim 11, wherein a tandem master cylinder (11) with two working chambers (19, 14) is used as a master cylinder and in that each working chamber (10, 14) of the tandem master cylinder is communicating with the pressure chamber (3) of the hydraulic power booster (1) by way of a connecting valve (19) connected to the 2/2-way valve.

13. A hydraulic brake system as claimed in claim 12, wherein the connecting valve (19) comprises two valve units associated with one control chamber (20), wherein each valve unit has a normally open first valve passage (23, 25; 24, 26) by means of which a communication is established between a working chamber (10, 14) and an unpressurized supply reservoir (12); and wherein a normally closed second valve passage (27, 29; 28, 30) is switched into an open position when the 2/2-way valve (18) connected to the pressure chamber (3) of the hydraulic power booster (1) is actuated, whereby with the first valve passage (23, 25; 24, 26) closed, a communication is established between the pressure chamber (3) of the hydraulic power booster (1) and the working chambers (10, 14) of the master cylinder (11).

14. A hydraulic brake system as claimed in claim 12, wherein each valve unit is designed as a hydraulically controllable double-seat valve; wherein in each valve unit a control piston (21, 22) provided with valve closure members (23, 27; 28, 24) is arranged; and wherein effective surfaces of the control pistons (21, 22), which are bearing against each other, are exposed to a control chamber (20) which may be pressurized by way of a 2/2-way valve (18) by the pressure of the pressure chamber (3) of the hydraulic power booster (1).

15. The hydraulic brake system as claimed in claim 14, wherein a control chamber (77, 78) is associated with each control piston (21, 22); wherein each control chamber (77, 78) is pressurizable by the pressure of the pressure chamber (3) of the hydraulic power booster (1) by way of a respective 2/2-way valve (79; 80); and wherein each control chamber (77, 78) is confined by a supporting surface for the control piston (21, 22).

16. A hydraulic brake system as claimed in claim 15, wherein the control chamber (20, 77, 78) of the connecting valve (19, 75, 76) normally communicates with the unpressurized supply reservoir (12) by way of a 3/2-way valve (81) controllable by slip control electronics and wherein, in the operating position of the 2/2-way valve (18), the control chamber (20, 77, 78) directly communicates with the pressure chamber (3) of the hydraulic power booster (1).

* * * * *